(12) United States Patent
Merritt

(10) Patent No.: US 8,624,715 B2
(45) Date of Patent: Jan. 7, 2014

(54) SYSTEM AND METHOD FOR ALTERING OBSTRUCTION FOR A BICYCLE MOUNTED ON A VEHICLE

(76) Inventor: Janneh Merritt, Brisbane, CA (US)

( * ) Notice: Subject to any disclaimer, the term of this patent is extended or adjusted under 35 U.S.C. 154(b) by 277 days.

(21) Appl. No.: 13/277,453

(22) Filed: Oct. 20, 2011

(65) Prior Publication Data

US 2013/0099909 A1  Apr. 25, 2013

(51) Int. Cl.
*B62J 3/00* (2006.01)

(52) U.S. Cl.
USPC .......................................... 340/432; 340/436

(58) Field of Classification Search
USPC ......................................................... 340/432
See application file for complete search history.

(56) References Cited

U.S. PATENT DOCUMENTS

| | | | | |
|---|---|---|---|---|
| 4,916,429 A | * | 4/1990 | Hicks et al. ................... | 340/436 |
| 5,389,912 A | * | 2/1995 | Arvin ............................ | 340/435 |
| 5,424,713 A | * | 6/1995 | Thompson et al. ........... | 340/436 |
| 5,710,553 A | * | 1/1998 | Soares .......................... | 340/903 |
| 6,731,202 B1 | * | 5/2004 | Klaus ......................... | 340/425.5 |
| 6,737,960 B2 | * | 5/2004 | Preston ...................... | 340/426.1 |
| 7,585,257 B2 | * | 9/2009 | Miyamaru et al. .............. | 482/57 |
| 7,688,187 B2 | * | 3/2010 | Caird et al. .................... | 340/436 |
| 7,877,209 B2 | * | 1/2011 | Harris et al. ................... | 701/301 |
| 8,040,226 B2 | * | 10/2011 | Birging et al. ................. | 340/436 |
| 2004/0183661 A1 | * | 9/2004 | Bowman ....................... | 340/435 |
| 2008/0238643 A1 | * | 10/2008 | Malen ........................... | 340/438 |
| 2012/0299712 A1 | * | 11/2012 | Sowa et al. .................... | 340/435 |

* cited by examiner

*Primary Examiner* — Kerri McNally

(57) ABSTRACT

Systems and methods may be provided for alerting a user of an obstruction to a bicycle mounted on a vehicle. An obstruction sensing device may be provided that may be mounted on the bicycle. The obstruction sensing device may include an engagement mechanism configured to attach the obstruction sensing device to a bicycle, an emitter configured to emit a detection signal, a receiver configured to receive a reflection of the emitted detection signal that may indicate an obstruction, and a transmitter configured to transmit an alarm signal when the reflection is received by the receiver. In some embodiments, a remote may be provided that may alert a user.

20 Claims, 11 Drawing Sheets

SIDE VIEW

FRONT VIEW

TOP VIEW

SYSTEM AND METHOD FOR ALTERING OBSTRUCTION FOR A BICYCLE MOUNTED ON A VEHICLE

FIELD OF TECHNOLOGY

This disclosure relates generally to an obstruction detection system and in one exemplary embodiment, to a system and method for alerting obstruction for a bicycle mounted on a vehicle.

BACKGROUND

Objects, such as bicycles, may be carried on the roof of a vehicle. One or more bicycles can be attached to the vehicle via a roof mounted rack. A risk associated with this practice is forgetting that the bicycle is on the vehicle when driving the vehicle. It is well known that people attempt to enter their garage or other structure with the bicycle still on the roof of the vehicle. When this happens, damage can occur to the bicycle, the roof rack, the vehicle, and the garage. Similarly, damage may occur when a vehicle with a roof-mounted bicycle drives beneath any low-ceilinged passage or low-overhanging structure. There have been cases where drivers have had difficulty getting insurance reimbursement for such accidents.

There are some existing solutions to this problem. One is to place a garbage can or other object in the entrance of the garage so that when returning, the vehicle cannot enter the garage. The object serves as a reminder to the driver. Another method is to place a mirror above the garage door so that when attempting to enter the garage, the bicycle can be seen, reminding the driver to remove it. Another method is to put the vehicle's garage door opener in an inconvenient place. When retrieving the opener, the driver is more likely to remember that the bicycle is on the vehicle. Another option is to discontinue parking the car in the garage. Finally, there are numerous collision avoidance systems for vehicles based on video signals or interpreting the reflections from laser or ultrasonic sources. These are used to find and identify hazards in the vehicle's path.

There are shortcomings to all these solutions. The garbage can method requires the driver to place and remove the garbage can or other object. That is two extra steps added to the process of going for a bike ride. Additionally, it is possible for the driver to forget to place the object or for someone other than the driver to move the object. The mirror method requires a large mirror so that it is not overlooked when entering the garage. A large mirror mounted above the garage is not aesthetically pleasing. Putting the garage door opener in a hard to access place is an inconvenience and a step that can be forgotten. The option of not using the garage has the obvious shortcoming that the driver no longer enjoys the benefits of parking their car in a garage. The collision avoidance systems have the shortcoming that they do not have the ability to detect when there is a difference in the vehicle, such as the presence or absence of a bike on top. Without this capability, the collision avoidance system will give many false positives. This could result in the user ignoring a genuine positive and cause a collision.

Another attempt to solve this problem is to provide a detector within a roof rack of a vehicle that emits a signal when a bicycle is mounted on the roof rack. See U.S. Patent Publication No. 2009/0256707, which is hereby incorporated by reference in its entirety. However, this may require that the bicycle be precise placed on the roof track in order to engage the detector. Also, this does not accommodate for different heights in the vehicle or the bicycle, which may result in false positives, or not detecting a genuine collision threat.

Therefore, a need exists for improved systems and method for alerting a user of an obstruction for an object mounted on a vehicle. A further need exists to alert a user of an obstruction for a bicycle mounted in a roof of a vehicle.

SUMMARY

This invention relates to protecting bicycles that are mounted atop a vehicles roof. Many vehicles have roof racks that can accommodate several bicycles. An obstruction sensing device that is fixed on the bicycle(s) will prevent car owners from damaging bicycle(s) fixed atop of vehicles. Individuals that have ruined bicycles and garages can now be warned of impending or low hanging structures that could potentially damage the bicycle, car and potentially garages and other low fixtures. With this invention, bike owners can now be warned prior to coming into contact with low hanging fixtures. Obstruction sensing devices can be mounted separately on individual bikes.

The existing alternatives to using a bicycle-mounted obstruction sensing device are plenty. By placing the bicycles behind the vehicle, instead of mounting the vehicles on top the vehicle, an individual can travel without using the device. An obstruction sensing device may still be desirable if the vehicle does not have a backup camera, by using the seat post device as a rear sensor. The individual(s) could also place the bicycle in the vehicle and not utilize the benefits of the devices. Another existing solution is to leave a marker in the car to remind the driver that a bicycle(s) are atop the car. Another option is to stop parking in the garage or under low hanging fixtures and park out side on the street or in the driveway.

The advantages to using this device would allow the individual to not worry about the safety of their expensive bicycles on top of the car, or mounted at the rear of the car. Damaging public and private property would no longer be an issue. The driver would not have to second-guess whether the vehicle will fit underneath a low hanging fixture. The driver does not have to get out of the car to decide whether or not the car and bicycle can fit under the structure. The advantages of this device are that the technology is simple and reliable. The device may incorporate technology has been around for over 50 years and may incorporate commonly used components that may be used regularly in many devices such as remotes and motion/proximity sensors.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
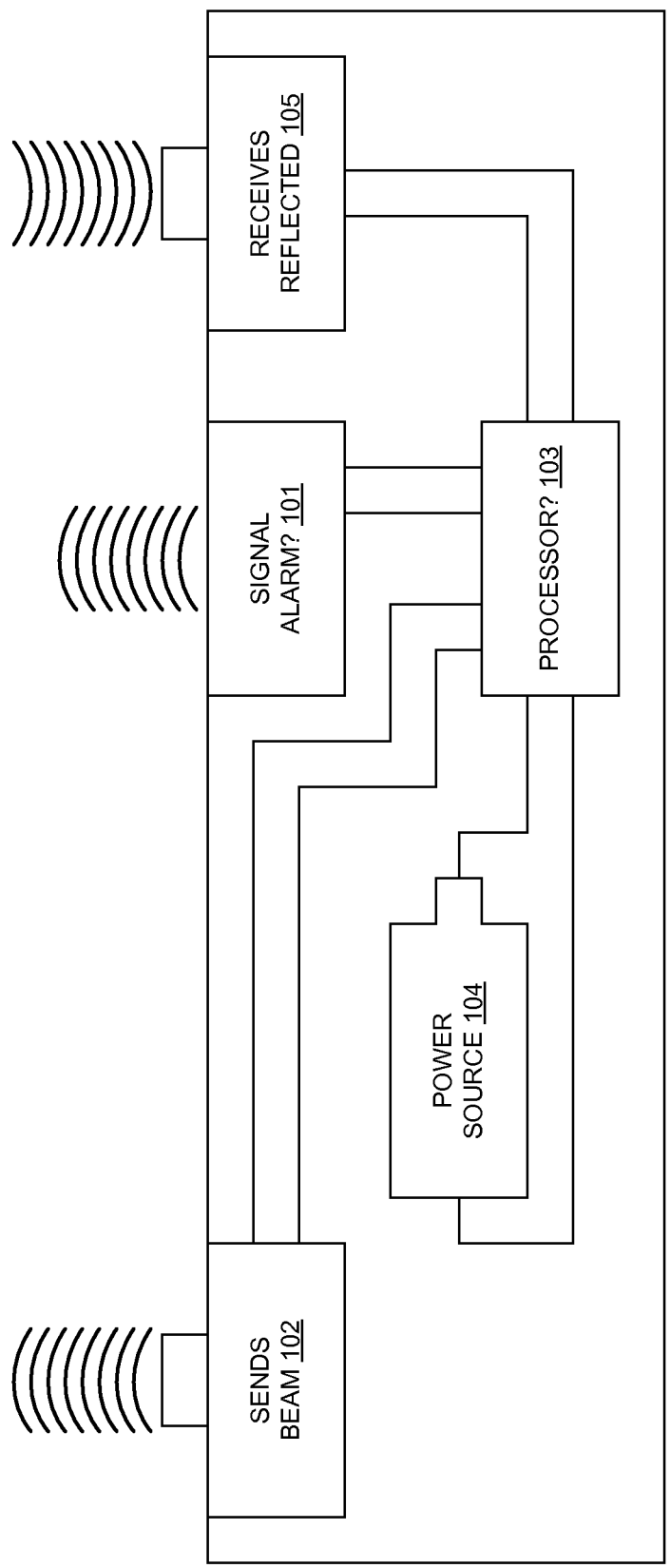
FIG. 1 provides an overhead view of an obstruction sensing device in accordance with an embodiment of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and method for alerting a user of an obstruction for an object mounted on a vehicle. Various aspects of the invention described herein may be applied to any of the particular applications set forth below or for any other types of obstruction sensing systems and methods. The invention may be applied as a standalone system or method, or as part of a bicycle monitoring and protection system. It shall be understood that different aspects of the invention can be appreciated individually, collectively, or in combination with each other.

An obstruction sensing device may be used to prevent objects (such as bicycles) from being damaged while on top of vehicles. The obstruction sensing device may prevent the objects from being damaged while mounted on the rear of vehicles, or protruding from any side or portion of the vehicle.

The device may send signal in a first direction. If an obstruction is encountered, the signal may be bounced back from the obstruction. Upon receiving that same bounced signal, the device would trigger an alarm. This alarm would signal the driver that an obstruction, such as a low hanging structure, is present or approaching.

Examples of obstructions may include a garage, sign, bridges, tunnels, underpasses, overpasses, low-hanging structures, or low-hanging branches. The alarm may warn a driver o the obstruction in sufficient time so that the driver can prevent the vehicle from cashing into the obstruction with the bicycle mounted on the vehicle. This may prevent costly damage to the bicycle, vehicle and/or obstruction.

The signal may be an infrared (IR) signal. Other examples of signals may include but are not limited to radio signal (such as radiofrequency RF signal), ultrasonic signal, laser, LED, or other visible optical signal.

Any type of proximity sensing known in the art may be used, such as emitting an electromagnetic or electrostatic field, or a beam of electromagnetic radiation (infrared, for instance), and looking for changes in the field or return signal. The object being sensed may be referred to as an obstruction or proximity sensor target. Different proximity sensor targets may or may not require different sensors. For example, a capacitive or photoelectric sensor might be suitable for a plastic target; an inductive proximity sensor requires a metal target. Preferably, a sensing mechanism for the obstruction sensing device may be selected to be agnostic to the material of the target. Types of sensors that may incorporated with an obstruction sensing device may include inductive sensors, capacitive sensors, capacitive displacement sensors, eddy-current sensors, magnetic sensors, photocell (reflective) sensors, laser rangefinder, sonar (typically active or passive), radar, passive thermal infrared, passive optical (such as charge-coupled devices), or reflection of ionizing radiation.

The maximum distance that this sensor can detect is defined "nominal range". Some sensors may have adjustments of the nominal range or means to report a graduated detection distance. In some embodiments, the nominal range may be a set parameter. For example, a user may be able to select an obstruction sensing device that may have a particular nominal range. In other embodiments, the obstruction sensing device may have a user adjustable nominal range. For example, the user may set the obstruction sensing device to provide an alarm if an obstruction falls within a particular range of distance set by the user. For example, the nominal range may be about 3 feet or less, 5 feet or less, 7 feet or less, 8 feet or less, 9 feet or less, 10 feet or less, 12 feet or less, 15 feet or less, 17 feet or less, 20 feet or less, 25 feet or less, 30 feet or less, 35 feet or less, 40 feet or less, 50 feet or less, 60 feet or less, 70 feet or less, 80 feet or less, 90 feet or less, 100 feet or less, 120 feet or less, 150 feet or less, 200 feet or less, or any other numerical value or less from the obstruction sensing device.

In other embodiments, the sensing device may be able to determine the approximate distance of the obstruction and may provide different types of alerts or alarms depending on how far away the obstruction is. For example, a first type of alarm may be provided when an obstruction is sensed at a greater distance, and a second type of alarm may be provided when an obstruction is sensed at a closer distance. For example, an alarm of a first volume, pitch, rhythm, or other sound quality may be provided when the obstruction is within a first range of distance away, and an alarm of a second volume, pitch, rhythm, or other sound quality may be provided when the obstruction is within a second range of distance away. In one example, a soft alarm may be provided when an obstruction is 30-50 feet away, and a louder alarm may be provided when the obstruction is 0-30 feet away.

FIG. 1 provides an overhead view of an obstruction sensing device in accordance with an embodiment of the invention. An obstruction sensing device may have an emitter 102 that may send a beam. A receiver 105 may receive a reflected signal. If a reflected signal within a nominal range is received, an alert provider 101 may signal an alarm. The emitter, receiver, and alert provider may be in communication with a processor 103. A power source 104 may be connected to the processor and/or emitter, receiver and processor.

The emitter 102 may send a beam. The beam may be any type of signal, including those previously discussed. The beam may be an infrared signal. The emitter may be an infrared beacon. The beam may be emitted continuously or periodically. For example, the beam may be emitted about every 0.1 seconds, 0.25 seconds, 0.5 seconds, 1 seconds, 1.5 seconds, 2 seconds, 3 seconds, 4 seconds, 5 seconds, 7 seconds, 10 seconds, 15 seconds, 20 seconds, or 30 seconds. The beam may be emitted in a particular direction. For example, a beam may be emitted towards a "front" side of an obstruction sensing device. The beam may be a narrow focused beam, or may cover a wide area in the direction. In some embodiments, the beam may be emitted to cover a roughly conical space with the emitter at the apex. The conical shape may have any angle at the apex. For example, the angle may be about 0.1 degrees or less, 0.25 degrees or less, 0.5 degrees or less, 0.75 degrees or less, 1 degree or less, 1.5 degree or less, 2 degrees or less, 3 degrees or less, 4 degrees or less, 5 degrees or less, 6 degrees or less 7 degrees or less, 8 degrees or less, 9 degrees or less, 10 degrees or less, 12 degrees or less, 15 degrees or less, 20 degrees or less. The beam emitted may cover a sufficient area to detect an obstruction that may come in contact with the bike while reducing the likelihood of false positives.

A receiver 105 may receive a reflected signal. When an emitted beam encounters an obstruction, it may reflect back to the obstruction sensing device. In some embodiments, the received signal may be an infrared signal. The receiver may be an infrared receiver. The receiver may pick up on the bounced back signal. In some embodiments, the receiver may be separate from the emitter 102. Alternatively, they may be integrated. In some embodiments, the reflected signals may be picked up by the receiver if the obstruction is within the nominal range. In some embodiments, the strength of the emitter and/or the sensitivity of the emitter may adjusted to vary the nominal range. In some embodiments, the nominal range may be determined at the factory during manufacture. In some other embodiments, the nominal range may be automatically adjusted or may be adjusted by the user. A user may select a desired nominal range.

If a reflected signal within a nominal range is received by the receiver 105, an alert provider 101 may signal an alarm. An alarm signal may be the same or different signal from the emitted signal. An alarm signal may be any wireless signal. In some embodiments, the alarm signal may be an RF signal. In some embodiments, the alarm signal may be emitted in one direction, many direction, or all directions. The alarm signal may be received by an alarm emitting device. This may be discussed in greater detail elsewhere herein.

The processor 103 may send signals to and/or receive signals from the emitter 102, receiver 105, and alert provider 101. For example, the processor may instruct the emitter to send a signal, and may receive a signal from the receiver if a signal is received. If a signal is received, the processor may instruct the alert provider to signal an alarm. Based on the received signal, the processor may determine whether to send an alarm signal or not, or the type of alarm signal sent. In some embodiments, the processor and the emitter, receiver, and alert provider may communicate with one another via wired connections, or via wireless connections.

In some embodiments, the processor may include tangible/non-transitory computer readable media including computer code, instructions, or logic, for completing one or more steps or algorithm. A memory may be provided to the obstruction sensing device and may store one or more set of instructions or algorithm.

A system power source 104 may be connected to the processor and/or emitter, receiver and processor. In some embodiments, the power source may be a local energy storage device, such as a battery or ultracapacitor. In some embodiments, the energy storage system may include, but is not limited to, lead-acid ("flooded" and VRLA) batteries, NiCad batteries, nickel metal hydride batteries, lithium ion batteries, Li-ion polymer batteries, zinc-air batteries or molten salt batteries. In some embodiments, the local energy storage may preferably have a battery life exceeding 2 hours, 4 hours, 6 hours, 8 hours, 10 hours, 12 hours, 15 hours, 20 hours, 25 hours, or 30 hours. In some embodiments, the local energy storage may be rechargeable. In other embodiments, the power source may be connected to an external power source, such as the vehicle, or external energy storage system. In some embodiments, the power source may include an energy converting or generating device. For example, the power source may use solar energy and/or wind energy to recharge the energy storage system or to provide energy to the processor and other components.

An obstruction sensing device may be provided in accordance with an embodiment of the invention. The obstruction sensing device may include an engagement mechanism configured to attach the obstruction sensing device to a bicycle, an emitter configured to emit a detection signal, a receiver configured to receive a reflection of the emitted detection signal, and a transmitter configured to transmit an alarm signal when the reflection is received by the receiver. In some embodiments, the engagement mechanism may be configured to attach the obstruction sensing device to rails beneath the seat of the bicycle. In some other embodiments, the engagement mechanism may be configured to attach the obstruction sensing device to a seat post of the bicycle. An engagement mechanism may be configured to attach to any other portion of a bicycle. The engagement mechanism may keep the obstruction sensing device stationary relative to the bicycle while the bicycle is in transport. The engagement mechanism may or may not be adjustable to accommodate different shapes or sizes of the bicycle. The engagement mechanism may optionally be shaped to fit a specific part of the bicycle.

Figure 2:
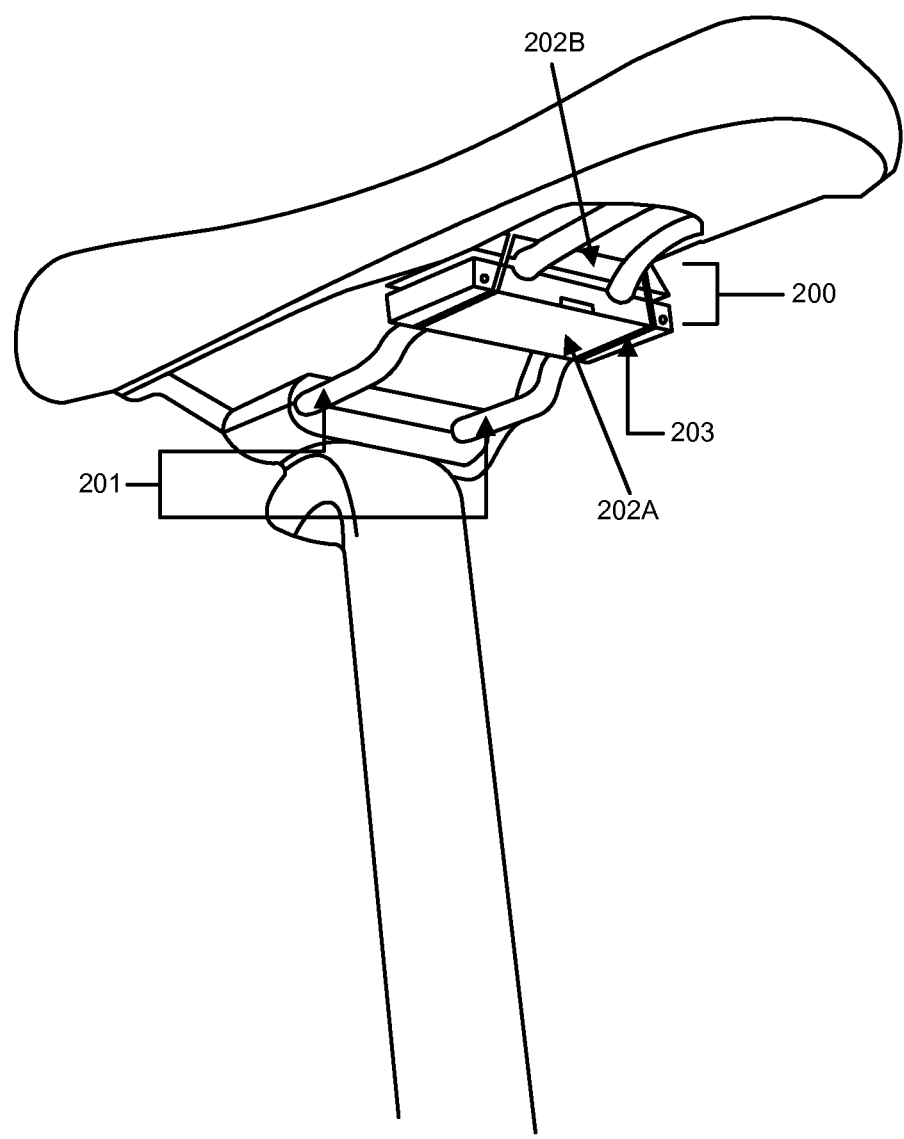
FIG. 2 provides a front view of a bike seat rail bars with an obstruction sensing device situated on bike seat rails in accordance with an embodiment of the invention.

FIG. 2 provides an example of a rail-mounted obstruction sensing device. A rail-mounted obstruction sensing device may project a signal, such as an infrared signal, from the device located on the bike seat rail bars to detect objects that are nearby or approaching objects within range. Upon receiving a bounced return signal, the device could trigger an alarm. It may sends signal to detect objects that are within a set nominal range. This alarm could signal the driver that a low hanging structure is present or approaching, or that any obstruction within a particular direction of the device is approaching.

FIG. 2 provides a front view of a bike seat rail bars 201 with an obstruction sensing device 200 situated on bike seat rails in accordance with an embodiment of the invention. The bike seat rails may be provided beneath the seat of the bicycle. In some embodiments, the front end of the obstruction sensing device (direction in which the signal may be emitted) may be facing toward the front end of the bike or seat. Alternatively, it may be facing toward the rear of the bike or seat, depending on how the obstruction sensing device may be mounted.

In some embodiments, the obstruction sensing device 200 may be provided as multiple parts 202A, 202B which may sandwich the rails 201 between them. One or more fastener 203 may be used to keep the parts of the obstruction sensing device around the rails. In some embodiments, the sandwiched portions may have one or more molded features, such as channels or grooves, that may configured to accept the bicycle rails, and may prevent the obstruction sensing device from shifting laterally while the bicycle rails are held between the parts.

Figure 4:
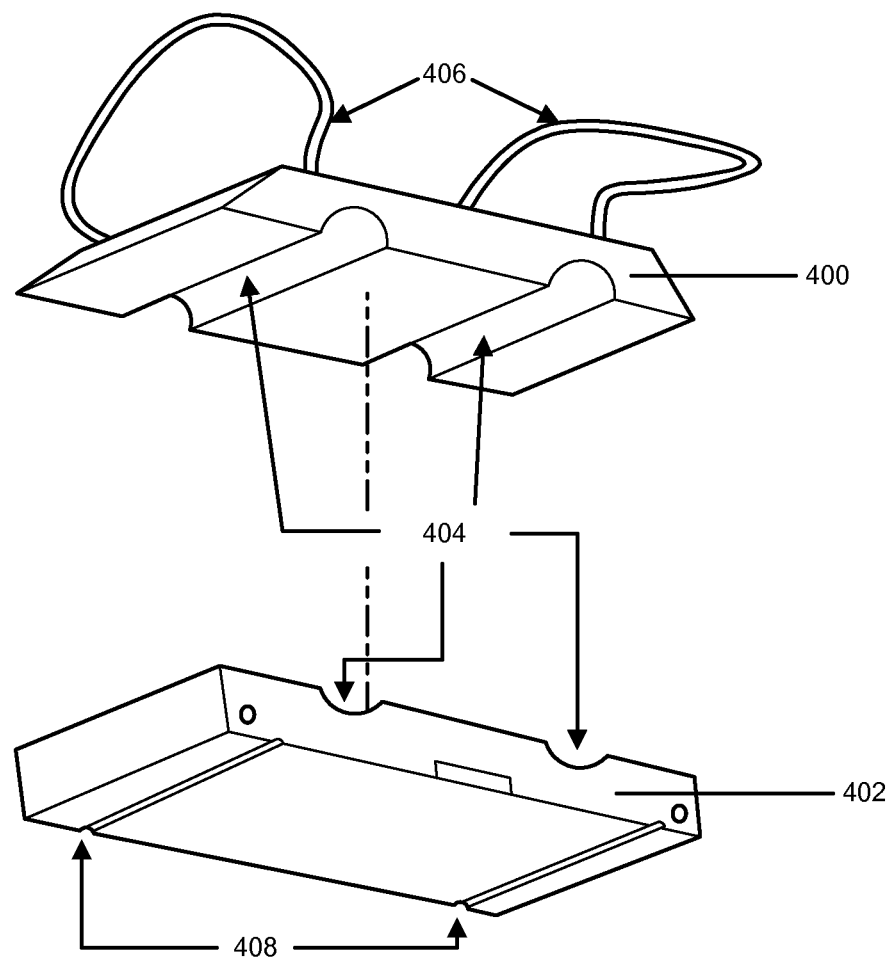
FIG. 4 shows an obstruction sensing device that is separated to show detail. This device may sit under a bike seat on bike seat rails.

FIG. 4 shows an obstruction sensing device that is separated to show detail. This device may sit under a bike seat on bike seat rails. The device may have two parts. A top mount 400 may sit on the bars (bike seat adjusting rails). A bottom portion 402 may be provided beneath the rails. In some embodiments, the bottom portion may be the functional part of the obstruction sensing device that may emit and/or receive signals, and may contain a processor and/or power source therein. In some embodiments, the bottom portion may emit and receive infrared signals, and may emit RF signals. However, in alternate embodiments, one or more of these functions may be performed and/or shared by the top mount and the top mount may have one or more of these components.

The top mount 400 and or bottom portion 402 may have one or more shaped features 404 that may be designed to accept bike seat adjusting rails between. The bike seat rails may be sandwiched between the top mount and the bottom portion. The shaped features may be shaped and/or positioned to fit a standard bike seat adjusting rail. In some embodiments, the shaped features may prevent the obstruction sensing device from shifting laterally when mounted on bike seat rails. In some embodiments, the shaped features may also prevent the obstruction sensing device from shifting forward and backward when mounted. When mounted, the fit between the obstruction sensing device and the bike seat rails may be sufficiently tight to prevent the obstruction sensing device from moving with respect to the bike seat rails while the bike is in transit. In some embodiments, the shaped features may include a flexible material, such as any elastomeric material such as certain plastics or rubber that may allow the device to be mounted tightly to the rails but provide some flexibility in positioning of the bike rails within the shaped features. In some embodiments, the flexible material may also provide a dampening effect to reduce vibrations transmitted to the obstruction sensing device while the bike is in transit. In some embodiments, the shaped features may be channels, grooves, ridges, or protrusions.

One or more fastener 406 may be provided to keep the top mount 400 and the bottom portion 402 together when mounted on bicycle rails. The fastener may include one or more rubber bands. In some embodiments, one, two, three, four, or more rubber bands may be provided. In one example, one rubber band may be provided on each side of the device, providing two rubber bands total. In some embodiments, the fastener may be fastened to the top mount. The bottom mount may include one or more grooves 408 to accept the fastener and keep the fastener in place. Other examples of fasteners may include, but are not limited to, clips, clamps, sliding and locking portions, press-fitting portions, hooks, latches, screws, or adhesives. In preferable embodiments, a fastener may be easily attached to and detached from the bicycle rails. Thus, an obstruction sensing device may be easily mounted or on the bicycle rails or removed from the bicycle rails.

Figure 9:
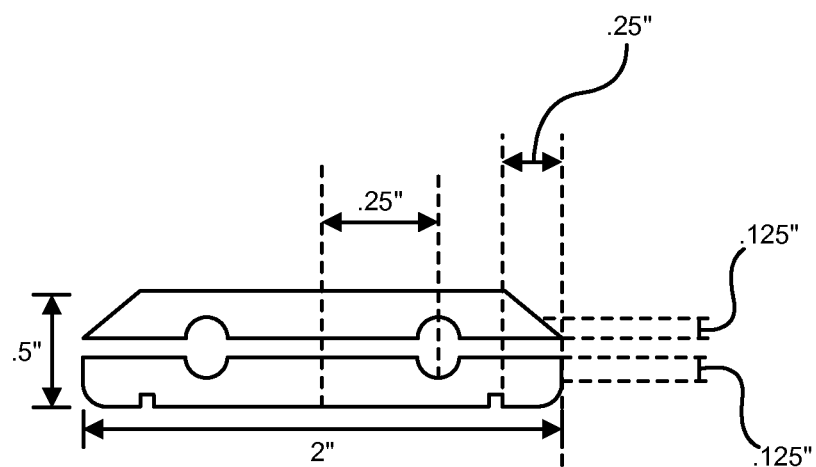

FIG. 9 provides a front view of a rail-mounted obstruction sensing device with measurements. The measurements may be provided by way of example only and are not to limit the device in any way. In some embodiments, the device may be about 2 inches wide and half an inch tall. The shaped features to accept the rails may be about half an inch part from one another. When a top portion and a bottom portion of the device are brought together, the shaped features may form a passageway or tube that may have an diameter of about a quarter inch. A bottom portion may include one or more groove that may accept a fastener. The bottom groove may be about a quarter inch from a side of the device.

Figure 10:
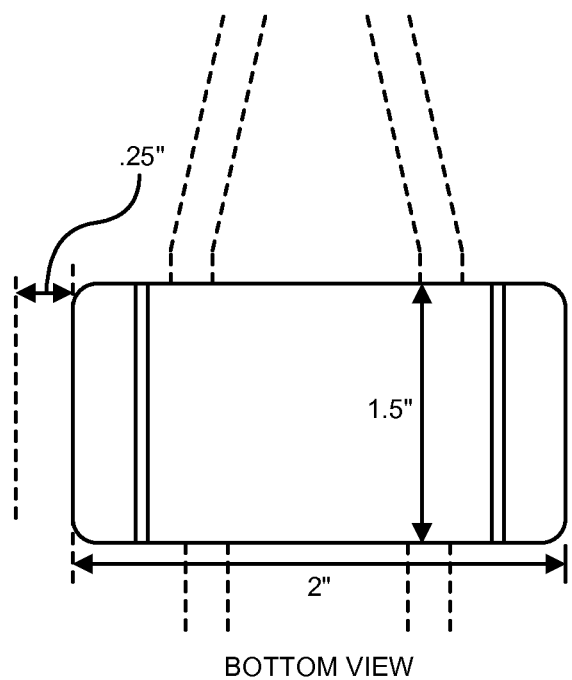
FIG. 10 provides a bottom view of a rail-mounted obstruction sensing device with measurements.

FIG. 10 provides a bottom view of a rail-mounted obstruction sensing device with measurements. The device may be about 2 inches wide and an inch and a half deep (front to back). One, two, or more grooves may be provided on the bottom portion of the device to assist with fastening the device. In some embodiments, one or more rails may pass through the device. The rails may be substantially parallel or may have a slight angle. Shaped features within the device may accommodate the position of the rails, whether parallel or angled. In some embodiments, the side of the bicycle seat may extend beyond the width of the device. In some embodiments, the side of the seat may extend about a quarter inch from the width of the device. The device may be wide enough to be fastened to a rail but not so wide so as to extend beyond the width of the seat and hamper a rider's movement.

Figure 3:
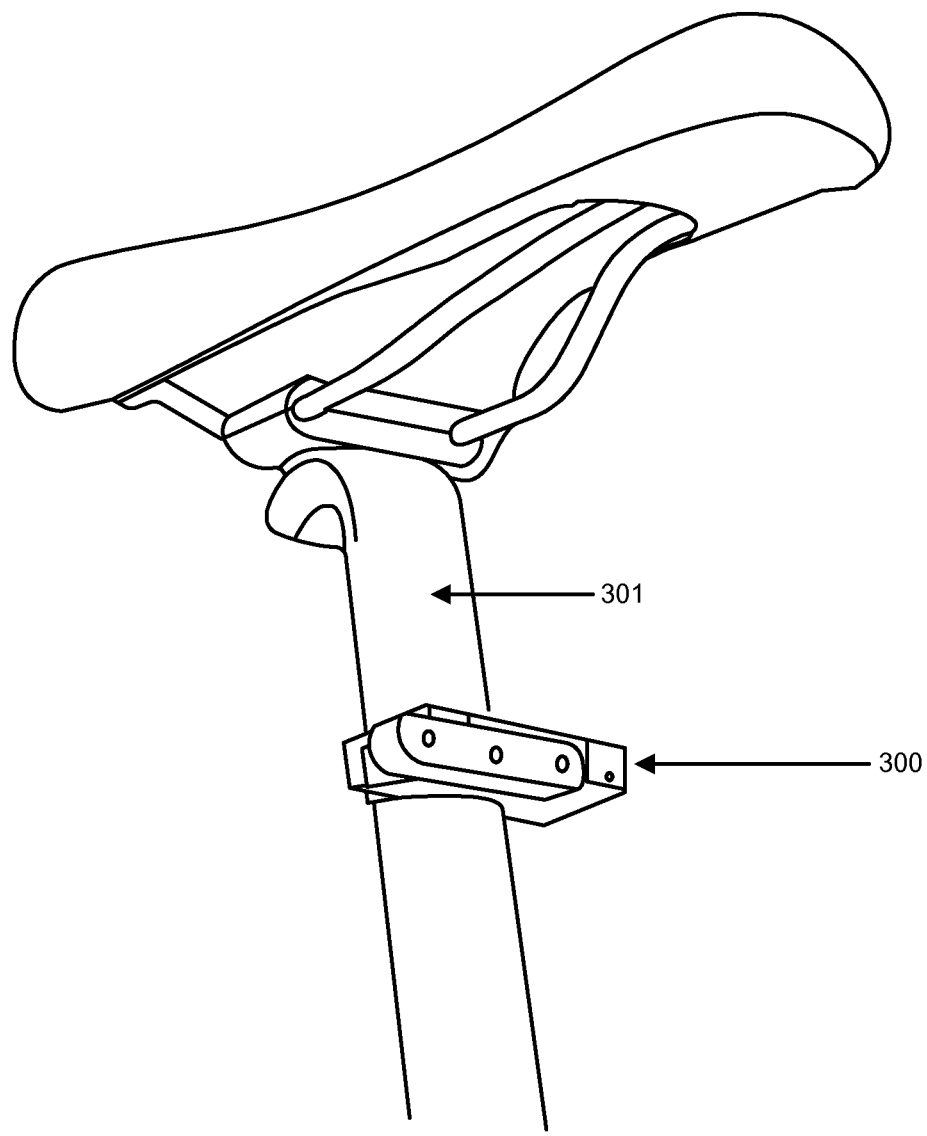
FIG. 3 provides a front view of a bike seat post with an obstruction sensing device mounted on a bike seat post in accordance with another embodiment of the invention.

FIG. 3 provides an example of a seat post-mounted obstruction sensing device. The seat post-mounted device located on the bike seat post can face either to the rear or forward and produce the same effects as a rail-mounted obstruction sensing device. The seat post-mounted obstruction sensing device may project infrared signals from a device located on the bike seat post to detect nearby or approaching objects that are within range. Upon receiving a reflected, bounced signal, the device could trigger an alarm. It may send signals to detect objects that are within a nominal range. This alarm could signal the driver that an obstruction, such as a low hanging structure, is present or approaching.

FIG. 3 provides a front view of a bike seat post 301 with an obstruction sensing device 300 mounted on a bike seat post in accordance with another embodiment of the invention. The obstruction sensing device may be located anywhere along the length of the post. For example, the obstruction sensing device may be provided towards the top of the seat post, or lower toward the bottom of the seat post. In some embodiments, the obstruction sensing device may be provided at the top of the seat post, or about 5%, 10%, 20%, 30%, 40%, 50%, 60%, 70%, 80%, or 90% of the way down the seat post. A user may select where the obstruction sensing device is mounted to the seat post. Once mounted the device may have a fixed position relative to the seat post, and need not change position while the bicycle is being transported. In some embodiments, while mounted, a user may or may not be able to adjust the device position along the seat post. In some embodiments, the user may have to detach the device from the seat post to adjust the position of the device.

The obstruction sensing device 300 may be mounted to point in any direction relative to the bike. For example, the front of the device, which may be the direction in which signals are emitted or received, may be oriented to correspond to the front of the bicycle. Alternatively, the front of the device may be mounted to correspond to the back of the bicycle, the side of the bicycle, or any angle within 360 degrees relative to the front of the bicycle.

Figure 5:
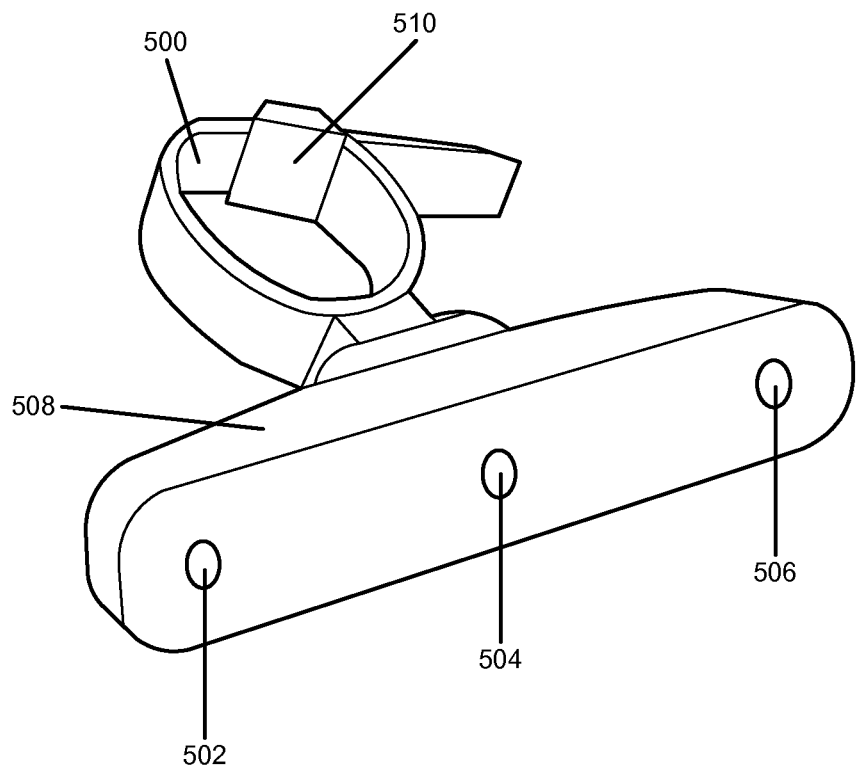
FIG. 5 shows an obstruction sensing device with locking strap or Velcro. The device is shown with exit and entry points for Infrared signals and RF signal output.

FIG. 5 shows an obstruction sensing device with locking strap 500 or Velcro. The device is shown with exit and entry points for signals 502, 504, 506, such as infrared signals to detect obstructions and RF signal output for alarms. These entry and exit points may be provided on a main obstruction sensing device body 508.

The locking strap 500 may attach the obstruction sensing device to the seat post. In some embodiments, the locking strap may be formed of a flexible material such as an elastomeric material. This may allow the locking strap to stretch around the seat post and hold the sensing device in place. Alternatively, a rigid or semi-rigid material, such as a plastic may be used to hold the obstruction sensing device in place. In some embodiments, the obstruction device may be sufficiently tightly held in place so as to not shift during transport of the bicycle. In some embodiments, the locking strap may be formed of a material that may dampen the effects of vibrations, so that the vibrations transmitted to the obstruction transmitting device main body 508 may be reduced while the bicycle is being transported. The locking strap may go all of the way around the seat post. It may or may not be fastened (e.g., Velcro, tying, zip-tie, belt-type configuration). In some embodiments, a fastening mechanism 510 may be provided. Alternatively, the locking strap may go partially around the seat post (e.g., it may allow the obstruction sensing device to clip into place, and may be removable). In some embodiments, the locking strap may clip around the seat post or be clamped to the seat post.

The main obstruction sensing device body 508 may be connected to the locking strap. One or more signal entry/exit points 502, 504, 506 may be provided. In some embodiments, a separate signal entry/exit point may be provided for an emitter, receiver, and/or alarm transmitter. Alternatively, one or more of these entry/exit points may be combined. In other embodiments, multiple entry/exit points may be provided for an emitter, receiver, and/or alarm transmitter. The placement of the entry/exit points may or may not matter—for example, the emitter may be in the center with the receiver and alarm transmitter on either side, the receiver may be in the middle with the emitter and alarm transmitter on either side, or the alarm transmitter may be in the middle with the emitter and receiver on either side.

Figure 6:
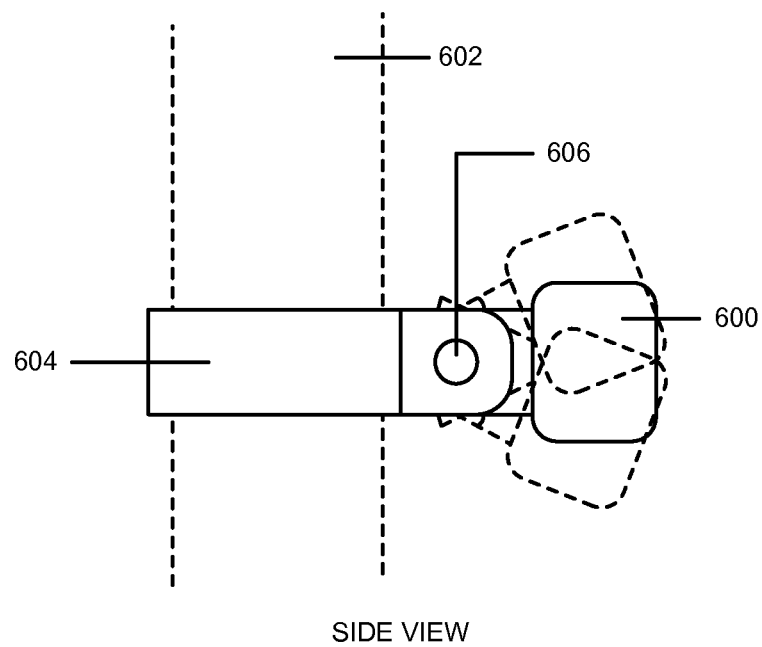
FIG. 6 provides a side view of an obstruction sensing device on a bike seat post. The dotted lines show possible positions for the obstruction sensing device.

FIG. 6 provides a side view of an obstruction sensing device 600 on a bike seat post 602.

The dotted lines show possible positions for the obstruction sensing device. The strap 604 of the obstruction sensing device may engage the device with the seat post. One or more pivot point 606 may be provided which may allow the obstruction sensing device to have multiple positions relative to the seat post.

In some embodiments, the pivot point may enable the obstruction sensing device to vary the angle that the obstruction device is pointing. The angle may be varied in an up and down position. In some embodiments, the angle may be varied continuously within a range. Alternatively, the obstruction device may click into certain positions within the range. In one example, the seat post-mounted obstruction sensing device may be attached to a three-position locking system. This allows the bike to sit in any position on the vehicle and still accurately send out the infrared signals due to the three-position locking system. The seat post-mounted obstruction sensing device may lock into any number of positions which may include, but are not limited to, 1, 2, 3, 4, 5, 6, 7, 8, 9, 10 or more positions.

The angle of the obstruction device may be maintained while the bicycle is in transport. The user may adjust the angle of the obstruction sensing device. The user may manually push the obstruction sensing device to a desired angle. In some embodiments, the range may be about ±90, ±80, ±70, ±60, ±50, ±45, ±40, ±30, ±20, ±15, ±10, ±5 degrees from horizontal or less. This may allow the beam signal emitted by the device to be angled correspondingly. In some embodiments, the obstruction device may only pivot up and down.

In other embodiments, one or more other pivot directions may be provided for the obstruction device. For example, a pivot may be provided that may allow the obstruction sensing device to be adjusted at an angle from side to side. The angle may be adjusted within a range of about ±90, ±80, ±70, ±60, ±50, ±45, ±40, ±30, ±20, ±15, ±10, ±5 degrees from front or less. In some embodiments, the pivot may be hinge or plurality of hinges, or may have a ratchet-type configuration. In other embodiments, the pivot may be a ball and socket type joint that may allow the obstruction sensing device to point in any direction.

Figure 7:
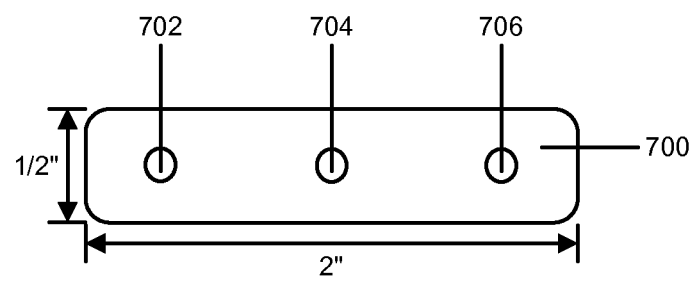
FIG. 7 provides a front view of a bike seat post-mounted obstruction sensing device. The device is shown with exit and entry points for Infrared signals and RF signal output.

FIG. 7 provides a front view of a bike seat post-mounted obstruction sensing device 700. The device is shown with exit and entry points 702, 704, 706 for signals, such as infrared signals for sensing obstructions and RF signal output. The measurements may be provided by way of example only and are not to limit the device in any way. In some embodiments, the device may be about 2 inches wide and half an inch tall. The device may have rounded corners. In some embodiments, the signal entry/exit points may be spaced evenly from one another. They may be provided as a row along the obstruction sensing device. In other embodiments, they may be positioned anywhere on the obstruction sensing device.

In some alternate embodiments, the obstruction sensing device may be able to twist an pivot so that rather than having the longer dimension in the horizontal direction, it may have the longer dimension in the vertical direction. For example, the obstruction sensing device may be oriented so that the signal entry/exit points are aligned in a vertical direction along the seat pots. Thus, the obstruction sensing device may b able to swivel about an axis that may correspond to the front-to-back axis of the device.

Figure 8:
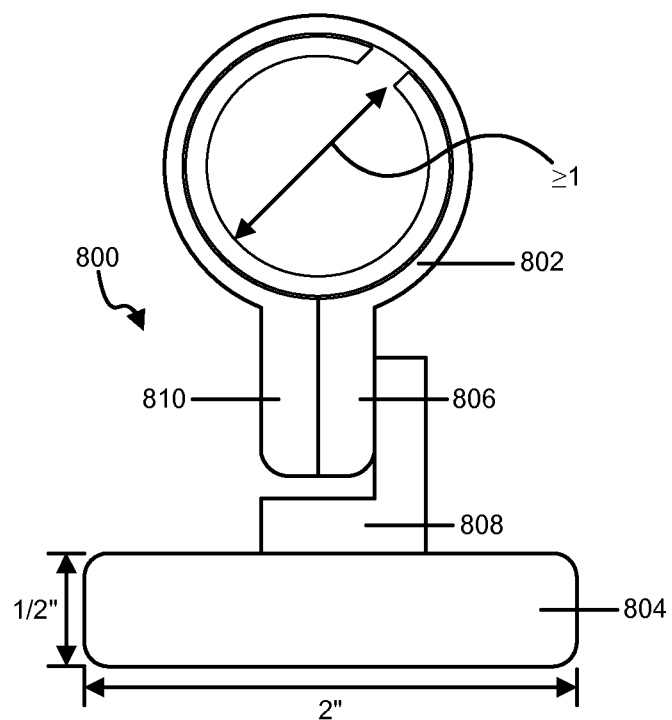
FIG. 8 provides a top view of a post-mounted obstruction sensing device with a locking system/Velcro and measurements FIG. 9 provides a front view of a rail-mounted obstruction sensing device with measurements.

FIG. 8 provides a top view of a post-mounted obstruction sensing device 800 with a locking system/Velcro and measurements. The obstruction sensing device may be attached to a bicycle seat post. The obstruction sensing device may have a locking strap 802 that may be configured to wrap around a seat post. An obstruction sensing device main body 804 may be connected to the locking strap via a connection 806.

The locking strap 802 may have any dimension. In some embodiments, it may have about an inch or less diameter. In some embodiments, the locking strap may wrap entirely around the seat post or may wrap only part way around the seat post. In some implementations, the locking strap may be formed of only one layer. In other implementations, the locking strap may have multiple layers, which may include a vibration absorbing layer, or a frictional layer that may prevent the obstruction device from sliding in an unwanted manner down the seat post. The locking strap may have a substantially circular cross-sectional shape. Alternatively it may have an elliptical or polygonal cross-sectional shape.

The main body 804 of the obstruction sensing device may have any dimensions. For example, it may be about 2 inches wide, and about half an inch deep (front to back). The main body may have rounded corners. The main body may send out infrared signals to detect obstacles while the bike is mounted on top of the vehicle.

The main body may include a connector 808 that may allow the main body to form a connection 806 with the locking strap. The connector 808 may be connected to a protrusion 810 of the locking strap at the connection 806. In some embodiments, the connection may be hinge. The connection may enable the main body of the obstruction sensing device to pivot within an angle range relative to the locking strap.

Any of the embodiments relating to the seat-post mounted obstruction sensing device may apply to any other pole of the bicycle. For example, the obstruction sensing device may be mounted on a fork of a bicycle, handlebars of a bicycle, front post of the bicycle, or anywhere along the frame of the bicycle. The obstruction sensing device may include a locking strap that may enable it to be affixed to any portion of the bicycle that may be surrounded by the locking strap. The locking strap may be able to adjust for different sizes of posts or portions of the frame or fork. The obstruction sensing device may be attached to any portion of the bicycle and send and/or receive signals in a forward direction, rear direction, or side direction.

An obstruction sensing device, may provide an alarm signal. In some embodiments, the alarm signal may be an RF signal. The obstruction sensing device may send the information via RF signal to a remote located on the user or within the user's vehicle.

Figure 11:
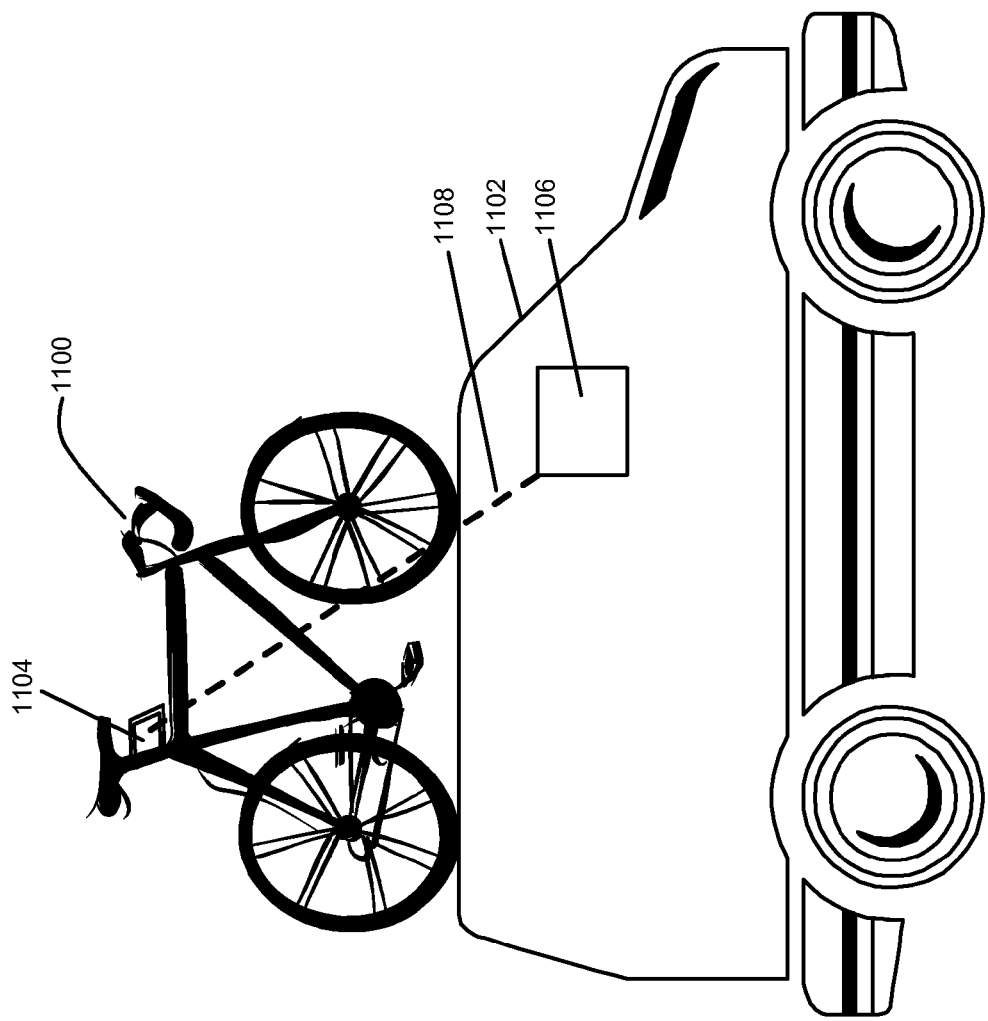
FIG. 11 provides an example of an obstruction alert system provided in accordance with an embodiment of the invention.

FIG. 11 provides an example of an obstruction alert system provided in accordance with an embodiment of the invention. The alert system may include a bicycle 1100, which may be mounted on a vehicle 1102. An obstruction sensing device 1104 may be mounted on the bicycle. A remote 1106 may be provided to a user or may be within the vehicle. In some embodiments, the remote may be part of the vehicle. One or more signal 1108 may be provided by the obstruction sensing device, and may be received by the remote.

The bicycle 1100 may be mounted to the roof of the vehicle 1102. The bicycle may be mounted with or without the front wheel and/or rear wheel which may cause the bicycle frame to be slanted or upright relative to the vehicle roof. In alternate embodiments, the bicycle may be mounted at the rear the vehicle, or within a trunk or bed of the vehicle.

An obstruction sensing device 1104 may be mounted on the bicycle 1100. In some embodiments, the obstruction sensing device may be mounted beneath a seat of the bicycle. The obstruction sensing device may be mounted to rails on the underside of the bicycle seat, or on a seat post. In other embodiments, the obstruction sensing device may be mounted to a front of the bicycle or anywhere on the frame of the bicycle. In some alternative embodiments, the obstruction sensing device may be mounted to a bicycle rack (such as a roof rack or rear rack) of the vehicle.

The obstruction sensing device 1104 may be facing forward relative to the vehicle 1102. Alternatively, it may be facing toward the rear of the vehicle, a side of the vehicle, or angled relative to the vehicle. The obstruction sensing device may be angled up or down to sensing an obstruction at a relevant height relative to the vehicle. For example if the bicycle 1100 is mounted to the roof of the vehicle, the obstruction sensing device may be angled to detect an obstruction that may be sufficiently low hanging to hit the bicycle and to provide a sufficient amount of warning so that an operator of the vehicle may have time to hit the brakes. The obstruction sensing device may also be angled or have a sufficient sensitivity to detect such an obstruction without generating many false positives.

In some embodiments, the obstruction sensing device may be able to sense obstructions in multiple directions. For example, one or more obstruction sensing device may be used to sense an obstruction to the front of the bicycle, to the rear of the bicycle and/or to the side of the bicycle. In some embodiments, a single obstruction sensing device may be able to sense obstructions in multiple directions. In some embodiments, a plurality of emitters and/or receivers may be provided, which may detect obstructions in multiple directions. For example, an obstruction sensing device may have an emitter and receiver to the front of the device, and an emitter and receiver to the rear of the device. In other embodiments, an obstruction sensing device may only detect obstructions in a single direction relative to the device. However, multiple obstruction sensing devices may be mounted to the bicycle to detect obstructions in multiple directions. For example, a first obstruction sensing device oriented to the front of the bicycle may be provided, and a second obstruction sensing device oriented to the rear of the bicycle may be provided.

In some embodiments, the same alarm signal or different alarm signals may be provided for obstructions sensed in different directions.

An alert provider of the obstruction sensing device 1104 may provide an alarm signal 1108 when an obstruction is sensed. The alarm signal may be directed to a remote within the vehicle or on the user. In some embodiments, the alarm signal may be directed downward into a cabin of the vehicle. In other embodiments, the alarm signal may be directed in a wide range of directions, or in all directions, to be picked up by the remote.

The remote 1106 may receive an alarm signal 1108 from the obstruction sensing device. The remote may be a device that alerts a user when it receives the alarm signal. The remote may alert the user by making an audio sound. For example, the remote may issue an audible alarm that may be of sufficient volume to capture the user's attention. The remote may have a pitch that captures the user's attention. The remote may issue a visual alert. For example, a light may start flashing. In some embodiments, the remote may start vibrating. Any combination of audio, movement, and/or visual alarms may be provided.

The remote 1106 may alert the user when an obstruction is detected and an alarm signal 1108 is provided. In some embodiments, the alarm signal may just be a signal that an obstruction is detected. In some embodiments, the alarm signal may indicate the distance that an obstruction is from the bicycle, or may indicate a range of distances. In some embodiments, when the alarm signal provides some indication of distance, the alert provided by the alert to the user may change based on the distance. For example, the remote may provide a louder alert as the obstruction gets closer. The remote may add visual aspects to an audio alert as the obstruction gets closer. Such differences in alerts provided to the user may be continuous and may have a direct relationship to the distance. Alternatively, differences in the alerts provided to the user may be discrete and may depend on the distance range that the obstruction falls into (e.g., distance ranges may be provided with 10-foot increments and different alerts may be provided for each of these increments).

In some embodiments, the alarm signal 1108 may indicate the direction of the obstruction relative to the vehicle. The remote 1106 may correspondingly indicate the direction of the obstruction relative to the vehicle. If the vehicle is approaching an obstruction to the front, and different alarm or the same alarm may be issued as when the vehicle is backing into an obstruction.

The remote may take any shape of form. The remote may be a portable device. The remote may be incorporated into a keychain of a user. The remote may be provided as a box or device that a user may carry around. The remote can be worn by the user, e.g., on the wrist. This may be useful in applications where the remote may vibrate or move. The remote may be incorporated or integral to the vehicle. For example, when an alarm signal is received, the warning may come to the user via the radio or speaker of the user's vehicle. The remote may be provided external to the vehicle. Alternatively, the remote may be brought into or remain within a cabin of the vehicle.

The obstruction sensing device may advantageously provide flexibility for options in mounting the device to detect an obstruction that may hit a bike that is mounted on a vehicle. The obstruction sensing device may also allow a user to orient the device to detect an obstruction even when the bike is mounted in different manners or when vehicles have different heights or configurations.

In some embodiments, the power source of an obstruction sensing device could become low on power. In some embodiments of the invention, when the power source is becoming low on power, the device may optionally warn a user. For example, if a battery is becoming low on charge, the obstruction sensing device may send an alert to the remote. The alert provided by the remote to the user may optionally be less intrusive than an alarm for an approaching obstruction. The alert provided by the remote for low battery charge to the user may be different for an alarm for an approaching obstruction.

In some embodiments, the obstruction sensing device does not turn on unless the remote is within a particular distance from the obstruction sensing device. This may prevent he power source from being unnecessarily drained. In some embodiments, while a remote is out of range, the obstruction sensing device may remain off and the power source, such as a battery, may not be drained. When a remote comes into range, the obstruction sensing device may be turned on and one or more signal may be emitted from the obstruction sensing device to sense an obstruction. In some embodiments, the range may be about 3 feet or less, 4 feet or less, 5 feet or less, 6 feet or less, 7 feet or less, 8 feet or less, 9 feet or less, 10 feet or less, 11 feet or less, 12 feet or less, 13 feet or less, 14 feet or less, 15 feet or less, 20 feet or less, 25 feet or less, or 30 feet or less between the obstruction sensing device and the remote. In some embodiments, the obstruction sensing device does not turn on unless the remote is within a cabin of the vehicle.

In some embodiments, the obstruction sensing device does not turn on unless it is mounted on a bicycle. For example, bringing multiple portions of the obstruction sensing device together (e.g., top and bottom portions of a rail-mounted obstruction sensing device) or wrapping the obstruction sensing device around a seat post (e.g., completing a loop formed by the locking strap) may cause the obstruction sensing device to turn on, or become fully operational).

In some embodiments, the remote may emit a signal that may be received by the obstruction sensing device. When the obstruction sensing device receives the signal from the remote, it may turn on and fully function. In some embodiments, the obstruction sensing device may passive receive the signal from the remote. In alternate embodiments, the obstruction sensing device may occasionally send out a signal querying whether a remote is within range. If the remote is within range, the obstruction sensing device may enter a fully functional state. Similar technologies to automobiles that may unlock when a key is in close proximity may be utilized.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. An obstruction sensing device comprising:
   an engagement mechanism configured to attach the obstruction sensing device to a bicycle;
   an emitter configured to emit a detection signal;
   a receiver configured to receive a reflection of the emitted detection signal; and
   a transmitter configured to transmit an alarm signal when the reflection is received by the receiver;
   wherein the engagement mechanism is configured to attach the obstruction sensing device to a seat post of the bicycle;
   and wherein the obstruction sensing device is attached at 30% or 40% of the way down the seat post from the top.

2. The device of claim 1 further comprising a processor in communication with the emitter, receiver, and transmitter.

3. The device of claim 2 further comprising a power source in communication with the processor.

4. The device of claim 1 wherein the detection signal is an infrared signal.

5. The device of claim 1 wherein the alarm signal is an RF signal.

6. The device of claim 1, wherein the engagement mechanism is a locking strap.

7. The device of claim 1, wherein the obstruction sensing device is attached to the bicycle seat post such as to be oriented to correspond to the front of the bicycle.

8. An obstruction alerting system comprising:
   an obstruction sensing device configured to attach to a bicycle mounted on a vehicle, wherein the obstruction sensing device has a transmitter configured to transmit an alarm signal when a reflection is received by a receiver; and
   a remote configured to receive the alarm signal and provide a sensory alarm to a user within the vehicle;
   wherein the obstruction sensing device is attached to a seat post of the bicycle with an engagement mechanism; and
   wherein the obstruction sensing device is attached at 30% or 40% of the way down the seat post from the top.

9. The system of claim 8 further comprising a processor in communication with the sensing device, the transmitter, and the remote.

10. The system of claim 9, further comprising a power source in communication with the processor.

11. The system of claim 8 wherein the alarm signal is a RF signal.

12. The system of claim 8, wherein the engagement mechanism is a locking strap.

13. The system of claim 8, wherein the obstruction sensing device is attached to the bicycle seat post such as to be oriented to correspond to the front of the bicycle.

14. A method of sensing an obstruction, comprising:
   attaching an obstruction sensing device to a bicycle with an engagement mechanism;
   emitting a detection signal by an emitter;
   receiving a reflection of the emitted detection signal via a receiver; and
   transmitting an alarm signal via a transmitter when the reflection is received by the receiver;

wherein the engagement mechanism is configured to attach the obstruction sensing device to a seat post of the bicycle; and wherein the attaching step includes attaching the obstruction sensing device to the seat post of the bicycle at 30% or 40% of the way down the seat post from the top.

15. The method of claim 14, further comprising a processor in communication with the emitter, the receiver, and the transmitter.

16. The method of claim 15, further comprising a power source in communication with the processor.

17. The method of claim 14, wherein the detection signal is an infrared signal.

18. The method of claim 14, wherein the alarm signal is an RF signal.

19. The method of claim 14, wherein the engagement mechanism is a locking strap.

20. The method of claim 14, wherein the obstruction sensing device is attached to the bicycle seat post such as to be oriented to correspond to the front of the bicycle.

* * * * *